United States Patent
Weghaus

(10) Patent No.: US 10,252,700 B2
(45) Date of Patent: Apr. 9, 2019

(54) ACCESS AND DRIVING AUTHORIZATION SYSTEM WITH INCREASED SECURITY AGAINST RELAY ATTACKS ON THE TRANSPONDING INTERFACE

(71) Applicant: Hella KGaA Hueck & Co., Lippstadt (DE)

(72) Inventor: Ludger Weghaus, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 15/573,847

(22) PCT Filed: May 11, 2016

(86) PCT No.: PCT/EP2016/060547
§ 371 (c)(1),
(2) Date: Nov. 14, 2017

(87) PCT Pub. No.: WO2016/184747
PCT Pub. Date: Nov. 24, 2016

(65) Prior Publication Data
US 2018/0257606 A1 Sep. 13, 2018

(30) Foreign Application Priority Data
May 15, 2015 (DE) .......................... 10 2015 107 640

(51) Int. Cl.
G07C 9/00 (2006.01)
B60R 25/24 (2013.01)

(52) U.S. Cl.
CPC ............ B60R 25/245 (2013.01); B60R 25/24 (2013.01); G07C 9/00174 (2013.01); G07C 9/00309 (2013.01); G07C 2009/00555 (2013.01); G07C 2009/00587 (2013.01); G07C 2009/00603 (2013.01); G07C 2009/00769 (2013.01); G07C 2209/63 (2013.01)

(58) Field of Classification Search
CPC combination set(s) only.
See application file for complete search history.

(56) References Cited

U.S. PATENT DOCUMENTS

| | | | |
|---|---|---|---|
| 2002/0025823 A1* | 2/2002 | Hara | B60R 25/24 455/456.5 |
| 2005/0030151 A1* | 2/2005 | Singh | B60R 25/1004 340/5.8 |

(Continued)

FOREIGN PATENT DOCUMENTS

| | | |
|---|---|---|
| EP | 2719584 A1 | 4/2014 |
| EP | 2719585 A1 | 4/2014 |
| WO | 2012/022802 A1 | 2/2012 |

Primary Examiner — Andrew W Bee
(74) Attorney, Agent, or Firm — Husch Blackwell LLP

(57) ABSTRACT

An authentication element, specifically a keyless go device for a vehicle. The authentication element has a transponding interface for transmitting an authentication signal and receiving power and data. The authentication element also has a key button device for detecting user input, whereby the authentication element is designed such that authentication signals are transmitted over the transponding interface if the key button device detects user input. An authentication system for vehicles includes at least one authentication element and an apparatus.

8 Claims, 2 Drawing Sheets

(56) References Cited

U.S. PATENT DOCUMENTS

| | | | |
|---|---|---|---|
| 2005/0242923 A1* | 11/2005 | Pearson | G07C 9/00309 340/5.62 |
| 2006/0087405 A1* | 4/2006 | Koike | B60R 25/04 340/5.64 |
| 2013/0208890 A1* | 8/2013 | Weghaus | G07C 9/00309 380/270 |
| 2014/0240090 A1* | 8/2014 | Mutti | G07C 9/00309 340/5.61 |
| 2014/0277837 A1* | 9/2014 | Hatton | B60R 25/24 701/2 |
| 2014/0375420 A1* | 12/2014 | Seiberts | B60R 25/2072 340/5.31 |
| 2015/0145648 A1* | 5/2015 | Winkelman | G07C 9/00309 340/5.72 |
| 2016/0247339 A1* | 8/2016 | Miller | B60R 25/24 |

\* cited by examiner

ACCESS AND DRIVING AUTHORIZATION SYSTEM WITH INCREASED SECURITY AGAINST RELAY ATTACKS ON THE TRANSPONDING INTERFACE

CROSS REFERENCE

This application claims priority to PCT Patent Application No. PCT/EP2016/060547, filed 11 May 2016, which itself claims priority to German Application No. 10 2015 107640.3, filed 15 May 2015, the entirety of both of which are hereby incorporated by reference.

FIELD OF THE INVENTION

This invention is an authentication element, specifically a keyless go device for a vehicle, and an authentication system for vehicles with at least one authentication element. The invention also involves a method for checking an authentication request intended by a user using a vehicle authentication element with an authentication system.

BACKGROUND OF THE INVENTION

Known authentication systems for vehicles such as "passive keyless systems" or "hands-free entry/go systems" or "keyless entry systems" do not require an authentication tool or a key to be used to activate certain actions.

Thus, it is possible with such systems, for example, to unlock a vehicle without active use of an authentication tool or car key and to start the vehicle by merely pressing a start button. This is made possible by the authentication tool or a keyless entry key with a chip that the user keeps on hand.

When systems known from the state of the art are used, the vehicle sends a weak signal with a range of a few meters, which is received by the authentication tool. The authentication tool then sends a signal to the vehicle, which the vehicle uses to determine whether the authentication tool is authorized and then, based on that determination, whether access or driving authentication commands can be implemented.

Thus, such authentication systems no longer require deliberate user interaction on the authentication tool. Instead, they merely check whether the authentication tool is in the immediate vicinity of the car (in the case of access) or inside the car (in the case of driving authentication) at the moment when an authentication check is supposed to take place.

In the context of these authentication or keyless entry systems, attack scenarios relying on special properties of the technologies associated with these systems are brought to the foreground.

Thus, attack scenarios are currently known which extend the associated transmission path of the authentication system or the transmission path between the key and the vehicle. These scenarios are known as relay station attacks (RSAs).

When this type of relay station attack is carried out, the signal of the vehicle to the authentication tool is forwarded or extended via a pair of antennas. An antenna/relay station must be close to the vehicle (typically fewer than 2 meters away) and the other antenna/relay station must be close to the authorized authentication tool (typically fewer than 2 meters away). The distance between the two relay stations (wireless transmission extension stations) can be very large here and is merely dependent on the specific implementation of the relay stations, whose objective is typically criminal in nature and on which it cannot be assumed that regulatory provisions have a limiting effect.

Consequently, the vehicle can be opened or started through a relay attack, even though the associated authentication tool is located outside of the usual distance for opening the vehicle or authenticating the driver for the vehicle.

There are a wide variety of technological approaches that make an RSA on keyless entry systems more difficult or even impossible. However, up to this point, these observations have been focused on the hands-free function and no one has considered the fact that there is a fallback solution for the actual convenience-driven hands-free function and the driving authentication function: an emergency start. This is designed to ensure that a vehicle is still able to start if an authentication tool has a power supply that is weak, defective or there is no power supply at all, or if it has any other defect.

This fallback solution is typically implemented in a configuration that requires the driver to hold the authentication tool at a specific position inside or outside the vehicle where a vehicle RFID transponder read coil is attached.

This coil supplies power to the authentication tool over a transformer coupling, which allows challenge-response communication to be conducted between the vehicle and the authentication tool. This process checks whether the authentication tool is authorized for the respective vehicle.

This emergency function involving supplying the authentication tool with power and communication for the purpose of authentication between the authentication tool and vehicle is also known as transponding. In the case of keyless entry systems, this is a fallback solution or emergency start.

Consequently, in addition to the actual keyless entry (hands-free function), there is a second, parallel path for acquiring driving authentication. This second path guarantees an emergency start function that has the purpose of ensuring the availability of functions such as the driving authentication function. Therefore, the aforementioned emergency start function can be used for tasks such as gaining access to a vehicle and starting it using an RSA.

SUMMARY OF THE INVENTION

Thus, the task underlying the invention is to specify an authentication element and an authentication system for vehicles in which, with minimal technical effort and in the simplest way possible, a relay attack on the emergency start function can be prevented.

Another task underlying the invention is to specify a method for checking an authentication request intended by a user using a vehicle authentication element with an authentication system in which a relay attack on the emergency start function of a vehicle can be prevented easily and which, ideally, has a simple design so that it can be integrated easily into existing systems.

This invention solves both issues specifically through the features of the independent patent claims. Additional advantageous embodiments of this invention are the object of the subclaims.

An initial aspect of this invention is to ensure that an authentication element, specifically a key or a keyless go device for a vehicle, has the features mentioned below.

Preferably the authentication element includes a transponding interface for transmitting an authentication signal and receiving power and data. This makes it possible to establish a wireless connection that can be used to send/transmit authentication signals and to receive power and data for the authentication element.

It is also advantageous if the authentication element features a key button device for detecting user input. The key button device can be used to detect active operation of the authentication element, which prevents an attack on the emergency start function.

It is also advantageous for the authentication element to be designed such that authentication signals are transmitted over the transponding interface if the key button device detects user input. Using this method, an authentication signal is transmitted by the authentication element if a user inputs information at the authentication element.

It is advantageous for the authentication element to be designed such that authentication signals are transmitted over the transponding interface only if the key button device detects user input. This embodiment allows authentication signals to be sent/transmitted to the authentication element only if user input has been detected. Otherwise, it is also possible to continuously transmit authentication signals over the transponding interface after receiving power.

Furthermore, it is advantageous if the authentication element has a signal processing and forwarding device, which is preferably connected to the transponding interface and the key button device. This enables the signal processing and forwarding device to communicate with the transponding interface and the key button device, to detect their signals/data and, preferably, to evaluate and compare the signals/data.

Furthermore, it is advantageous if a specified reference value is stored in the authentication element for comparison purposes, specifically in the signal processing and forwarding device. This enables the signal processing and forwarding device to reach decisions through comparison. Preferably, transmission of authentication signals depends on these decisions. The predeterminable reference value can preferably be set to freely definable values (e.g. duration of actuation of the key button device) by a programming device.

Preferably, the signal processing and forwarding device detects user input in the key button device. As such, the signal processing and forwarding device is capable of comparing detected user input with a reference value quickly and effectively.

It is also preferable if the signal processing and forwarding device transmits authentication signals over the transponding interface. Thus, the signal processing and forwarding device can control and initiate transmission of authentication signals.

It is also advantageous if the authentication signals contain user input detected at the key button device. In this way, the authentication element can transmit authentication signals with information about the key button device. This ensures that a special authentication element status can be transmitted to another apparatus that can evaluate this data and these signals to execute or approve a function, such as the function for starting a vehicle.

Preferably, the key button device includes an operating element for detecting user input. Preferably, this can be actuated through downward pressure, whereby it preferably moves back to the starting position afterwards. As such, a simple switch is provided that can be used to trigger an emergency start function as desired.

It is also preferable that the signal processing and forwarding device is designed such that the detected user input is compared with the reference value, specifically the predeterminable reference value.

This enables the signal processing and forwarding device to make a decision based on the comparison or the values, such as sending authentication signals.

It is also preferable that the signal processing and forwarding device transmits authentication signals over the transponding interface if the comparison is positive. At this point, authentication signals can now be transmitted/sent by the authentication element in order to successfully start a vehicle.

A second aspect of this invention is to ensure that an authentication system for vehicles with at least one authentication element and an apparatus.

Note specifically that the characteristics of the authentication element, as mentioned under the initial aspect of the invention, can be used individually or in combination with each other in the authentication system for vehicles.

In other words, the characteristics mentioned above under the first aspect of the invention concerning the authentication element can also be combined with further characteristics here under the second aspect of the invention.

It is advantageous for the authentication system if the apparatus of the authentication system features a reading device for transmitting power and data and receiving authentication signals. The reading device enables establishment of a wireless connection, whereby it is not just data and power that is transmitted over this connection, but authentication signals are also received.

It is advantageous if the apparatus is located on the vehicle side. More specifically, it is positioned in or on a vehicle. This means that the apparatus is connected to the vehicle and can be used, for example, to open and/or to start the vehicle.

It is also advantageous if the transponding interface of the authentication element can be attached to the reading device of the apparatus in order to transmit an authentication signal to the reading device after receiving power and data. As such, an authentication element without power can be supplied with external power and can resume its tasks.

It is also advantageous if the apparatus is designed such that a function is activated, specifically driving authentication, after receiving transmitted authentication signals. Preferably, the authentication signals are transmitted by the authentication element. As such, driving authentication can be issued just by receiving authentication signals. This is particularly advantageous if the authentication element is designed such that this element sends/transmits authentication signals under certain conditions (as described under the first aspect).

It is also advantageous if the authentication element is designed such that authentication signals that contain user input for the key button device are transmitted over the transponding interface. Here, it is advantageous if the apparatus is designed to compare the authentication signals transmitted by the authentication element with stored authentication signals. In this way, the apparatus can make a decision based on the comparison and activate a function, such as driving authentication for a vehicle, if the comparison is positive. Unlike the solution that has already been presented, the apparatus makes the decision to activate a function or carry out an action (not the authentication element). However, the decision for both variants depends on the evaluation of the user input for the key button device.

It is also preferable that the apparatus features a control device, specifically function logic for processing authentication signals, which is preferably connected with the reading device. This gives the control device or function logic the ability to control and direct the reading device. Thus, the tasks of the control device can be distributed to individual sub-elements, which are designed for the specific task. This makes it possible to handle the individual control tasks of the control device faster and more effectively.

It is also advantageous if authentication signals are stored in the apparatus for comparison purposes, specifically in the function logic. This allows the authentication signals stored in the apparatus to be compared to other authentication signals easily and quickly using the function logic.

It is also preferable if the received, transmitted stored authentication signals contain user input detected by the key button device. It is also advantageous if the function logic compares received authentication signals with stored authentication signals. This way, stored signals can be compared to those detected or transmitted in the authentication element, enabling functions such as enabling or disabling the granting of driving authentication depending on the user input, such as pressing or actuating an operating element.

A third aspect of this invention is to specify a method for checking an authentication request intended by a user using a vehicle authentication element with an authentication system, whereby the authentication system includes at least one authentication element and an apparatus.

Note specifically that the characteristics of the authentication system and in particular the authentication element, as mentioned under the initial and second aspects of the invention, can be used individually or in combination with each other during the process for checking the application.

In other words, the characteristics mentioned above under the first and second aspects of the invention concerning the authentication system and the authentication element can also be combined with further characteristics here under the third aspect of the invention.

The process preferably includes the following steps. A preferred step involves positioning the authentication element in the transmitting and/or reception area of the reading device of the apparatus. As a result, the authentication element can be placed at the location of the power intake. An additional preferred step involves receiving power, whereby the transponding interface of the authentication element receives power from the reading device of the apparatus. This enables the authentication element to be supplied with power wirelessly. An additional preferred step involves detection of user input at the authentication element using the key button device. In simple terms, this step involves detecting or measuring a button press or pressing an operating element on the authentication element and makes it available as a measured value. An additional preferred step involves the generation of authentication signals, which include the detected user input. This makes it possible to convert the detected user input into authentication signals, which enables easy transmission. An additional preferred step includes transmission of the authentication signals from the authentication element to the apparatus. This is how the detected authentication signals reach the apparatus. An additional preferred step involves comparison of the detected or transmitted authentication signals to stored authentication signals. Using the comparison, a decision can be made through the procedure or by the apparatus carrying out the procedure regarding whether a function, in particular a driving authentication, can be granted or remains denied.

For the following comparison step, it is advantageous if this step is carried out as an alternative to the detection, transmission and comparison steps. The preferred alternative step involves a comparison of the detected user input in the authentication element with a reference value, whereby, if the comparison is positive, transmission of authentication signals is initiated from the authentication element to the apparatus. This way, after a successful comparison of the detected user input with a reference value, a decision is made, which, if positive, results in transmission or transfer of authentication signals.

Furthermore, it is advantageous if the detection of the user input includes detection by the signal processing and forwarding device of the authentication element. This enables the signal processing and forwarding device to carry out the comparison and detection steps, making it possible to implement both steps easily and effectively.

It is also advantageous if the detection of the user input includes detecting that an operating element of the key button device has been pressed. As a result, it is easy to detect the user input.

Preferably, the reference value is stored in the signal processing and forwarding device of the authentication element. This makes it possible for the authentication element to use one comparison to reach a decision for the next comparison.

It is also preferable for the stored authentication signals to be stored in the function logic of the apparatus. This way, the effectiveness of the apparatus can be further increased for carrying out comparison and detection quickly and efficiently.

It is also preferable that, if the comparison is positive, the detected authentication signals match the stored authentication signals. It is also easy for the function logic here to check authentication signals for authenticity.

Note that "matching" authentication signals is to be understood in the sense that the apparatus or the function logic of the control device recognizes, based on the transmitted authentication signals and other factors, that user input is actually taking place at the authentication element or has taken place within a small definable time range.

Furthermore, it is preferable for the function logic to compare the authentication signals of the authentication element to the stored authentication signals of the apparatus. This way, it is easy for verification of the authentication signals to be carried out in the apparatus, which, as a logical consequence, enables the apparatus to carry out a decision or verification of the signals.

Furthermore, it is advantageous if, in the event of a positive comparison, the detected user input is below or above the reference value or matches the reference value. Using the reference value as a reference point, the signal processing and forwarding device can make this decision easily and securely.

It is also advantageous if the signal processing and forwarding device compares the detected user input to the stored reference value. This makes it possible for the authentication element to decide whether authentication signals are being transmitted, in order to finalize a check of an authentication request intended by the user at an authentication element of a vehicle.

It is also preferable if the signal processing and forwarding device uses a wireless connection of the transponding interface and reading device to transmit authentication signals to the function logic of the apparatus. This way, the apparatus can detect the check of an authentication request intended by the user at a vehicle authentication element and conclude this request as successful or unsuccessful.

Advantageously, the step for transmitting the authentication signals includes encryption and/or compression of the authentication signals. An additional protection mechanism can be implemented in the inventive procedure to prevent manipulation.

The previously presented procedure as well as the authentication element and the authentication system were specifically concerned with the protection of an emergency start function of a vehicle. The emergency start function is found in vehicles with keyless entry systems.

Here, in the event that an authentication element or a keyless entry key has no power for sending and receiving signals, the emergency start function is made available. This function involves supplying the authentication element with power using a transponding method, the same method used for RFID chips. Since the vehicle, more specifically its control system, cannot differentiate between an actual emergency start, e.g. whereby the battery of the authentication element is empty, and an attack on the emergency start function, the vehicle with an authentication system known from the state of the art would start and thus grant driving authentication.

On the other hand, the presented invention aims at preventing attacks on the emergency start function and detecting potential emergency start scenarios to ensure that only the owner of a vehicle may be granted driving authentication.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

In the following description, identical reference signs are used for identical objects.

Figure 1:
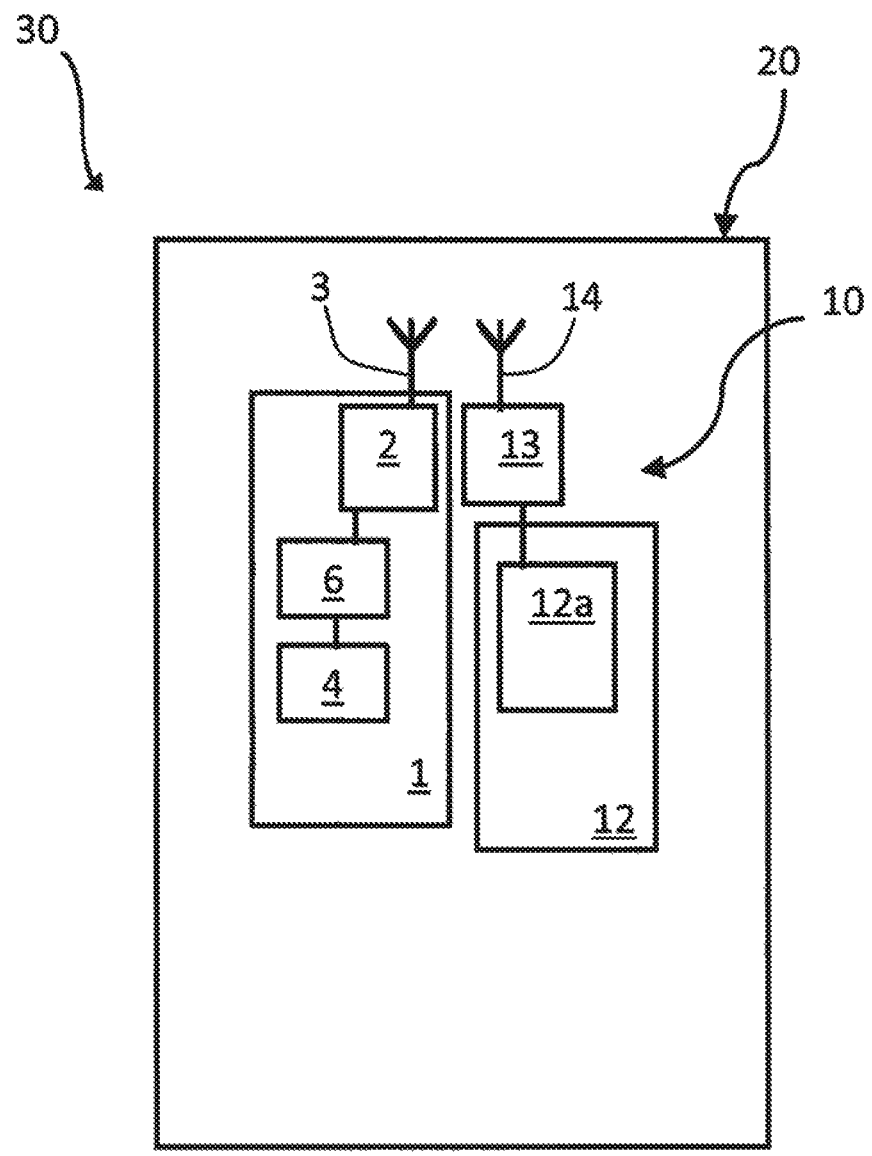
FIG. 1 is an authentication system with an authentication element and an apparatus.

FIG. 1 shows an authentication system (30) for a vehicle (20), which has an authentication element (1) and an apparatus (10).

The authentication element (1) is designed in this example as a key or a keyless go device for the vehicle (20) and has a transponding interface (2) for sending/transmitting authentication signals and for receiving power and data. Antennas (3) pictured on the transponding interface (2) merely depict the sending/receiving process visually.

Furthermore, the authentication element (1) has a signal processing and forwarding device (6). This is connected to both the transponding interface (2) and a key button device (4) for detecting the user input from a user on the authentication element (1).

The key button device (4) has a operating element (not pictured), e.g. a button, for detecting user input. This button is activated through pressing and then returns to its original position so that it can be pressed again.

In the signal processing and forwarding device (6) of the authentication element (1), a pre-defined reference value is stored for comparison with a measured or detected user input.

The signal processing and forwarding device (6) is also designed such that it compares the measured user input to the reference value, whereby, if the comparison is positive, the signal processing and forwarding device (6) transmits authentication signals over the transponding interface (2). Here, the authentication signals can include a user input detected by the key button device (4), allowing this movement and/or inclination to be transmitted, for example, to the apparatus (10).

In simple terms, the authentication element (1) is designed such that authentication signals are transmitted over the transponding interface (2), if the key button device (4) detects user input that corresponds to a pre-definable reference value.

The apparatus (10) of the authentication system (30) is on the vehicle side, i.e. positioned in the vehicle (20) and has a reading device (13) for sending power and data and receiving an authentication signal.

Furthermore, FIG. 1 shows that the transponding interface (2) of the authentication element (1) is attached to the reading device (13) for the apparatus (10) in order to transmit authentication signals to the reading device (13) after receiving power and data. Antennas (14) pictured on the reading device (13) merely depict the sending/receiving process visually.

In simple terms, the apparatus (10) is designed such that a function is activated, specifically driving authentication, after receiving transmitted authentication signals from the authentication element (1).

The apparatus (10) here has a control system (12) with a function logic (12a) for processing authentication signals that is connected to the reading device (13).

Thus, to summarize, after the transmission of authentication signals from the authentication element (1) to the apparatus (10) over a wireless connection of the reading device (13) and transponding interface (2), the function logic (12a) can send driving authentication, for example, for the vehicle (20).

In an alternative embodiment, the authentication element (1) is designed to transmit authentication signals over the transponding interface (2) that include user input from the key button device (4).

The apparatus (10) is also designed to compare the authentication signals transmitted by the authentication element (1) with stored authentication signals and to activate a function if the comparison is positive.

For this purpose, authentication signals are stored in the function logic for comparison (12a). This allows received/transmitted and stored authentication signals to be compared. For the sake of completeness, it should be expressly noted that, in this alternative, the transmitted and stored authentication signals include user input detected by the key button device (4).

Of course, it is also possible to combine the two aforementioned versions with each other.

Figure 2:
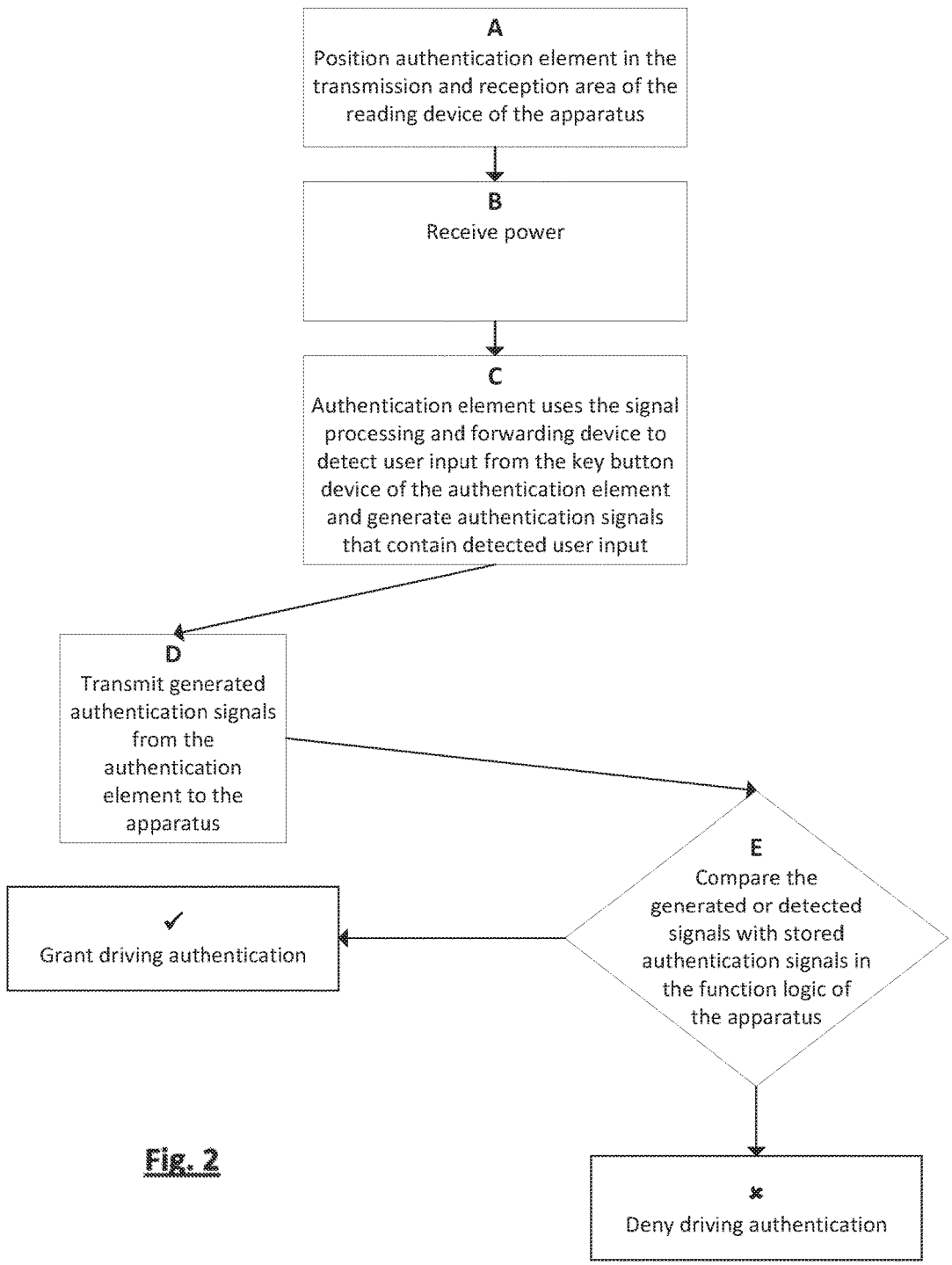
FIG. 2 is a method for checking an authentication request intended by a user using an authentication element (1).

FIG. 2 shows a method for checking an authentication request intended by a user using an authentication element (1). This check takes place specifically as part of an emergency start function. This function is found in vehicles with keyless entry systems.

Here, in the event that an authentication element or a keyless entry key has no power for sending and receiving signals, the emergency start function is made available. This function involves supplying the authentication element with power using a transponding method, the same method used for RFID chips.

Since the vehicle (20), more specifically its control system (12), cannot differentiate between an actual emergency start, e.g. whereby the battery of the authentication element (1) is empty, and an attack on the emergency start function, the vehicle (20) with an authentication system known from the state of the art would start and thus grant driving authentication. This type of attack is detected and prevented here.

After positioning the authentication element (1) in the transmission and reception area of the reading device (13) of the apparatus (10) in step A, power is received in step B. Here, the transponding interface (2) of the authentication element (1) receives power from the reading device (13) of the apparatus (10). This takes place through the process of transponding, during which power is transferred from one element to another through magnetic fields (for example), similar to how an RFID chip works.

Following this, the authentication element (1) is able to use the signal processing and forwarding device (6) in step C to detect user input from the key button device (4) of the authentication element (1) and to generate authentication signals that contain the detected user input.

In step D, the generated authentication signals are transmitted from the authentication element (1) to the apparatus (10) in order to compare these generated or detected authentication signals in step E with stored authentication signals in the function logic (12a) of the apparatus (10).

If the comparison of the detected authentication signals with the stored authentication signals is positive or if the two signals match, driving authentication is granted in step F, i.e. the vehicle (20) starts.

Note that "matching" authentication signals is to be understood in the sense that the apparatus (10) recognizes that a certain user input is actually being carried out at the authentication element.

In an alternative method, steps A and B are the same as described above while the subsequent steps differ.

In this case, step C involves detection of the user input from the key button device (4) of the authentication element (1) by the signal processing and forwarding device (6) and comparison of this user input with a reference value, whereby, in the event of a positive comparison, the transmission of authentication signals from the authentication element (1) to the apparatus (10) is initiated.

The reference value is stored in the signal processing and forwarding device (6) of the authentication element (1), whereby the signal processing and forwarding device (6) compares the detected user input to the stored reference value. The comparison is also positive if the detected user input matches the reference value.

As soon as this condition is fulfilled, signal processing and forwarding device (6) uses a wireless connection of the transponding interface (2) and reading device (13) to transmit authentication signals to the function logic (12a) of the apparatus (10). This allows driving authentication to be granted and the vehicle (20) to be started.

While, in simple terms, it is the apparatus (10) that decides whether driving authentication can be granted in the first outlined procedure, in the second outlined procedure this is determined by or in the authentication element (1). In the second case, driving authentication has already been granted if the authentication signal is received by the apparatus.

Regarding both described procedure variants, the step of transmitting the authentication signals can include encryption and/or compression of the authentication signals. This increases the safety of the transmission.

In other words, the invention can, for example, also be reproduced or briefly summarized in the manner described as follows.

A user is sitting in a café at some arbitrary distance from their vehicle and their authentication element (1) or keyless entry key is in their jacket pocket or laptop case.

Then, an attack via wireless transmission extension (RSA) is carried out on the emergency start function of the vehicle or the authentication element.

An attacker has gained access to the vehicle already and now wishes to start the vehicle. To do so, they press the start button of the vehicle. Since the vehicle does not detect a valid authentication element in the vehicle, the attacker is given the option to carry out an emergency start, as the battery of the authentication element could be dead.

For this purpose, transponding is initiated by the vehicle, upon which the attacker or even the actual user places their dead authentication element in a specific location in the vehicle or lays it in a special compartment. The authentication element is supplied with power through a transformer coupling, giving the authentication element the ability to calculate a "response" to the "challenge" that is received along with the power and to send this response back to the vehicle.

The attacker uses their own apparatus in the vehicle to receive the signals now being generated by the vehicle (primarily the signal known as the "challenge"). Using an arbitrary communications channel, these signals are transferred to a second attacker located in the vicinity of the original authentication element, i.e. in the café mentioned previously.

This second attacker has an apparatus on hand that is used to generate signals identical to those sent by the vehicle. The authentication element receives these signals and switches to a transponding/emergency start mode because it cannot recognize whether or not these signals are from an attacker.

If an implementation known from the state of the art were being used, the authentication element would, at this point, answer with the "response," which the second attacker could pass on to the attacker in the vehicle in order to reproduce the signals so that the vehicle recognizes a valid authentication element and would then grant driving authentication. This would constitute a successful RSA attack on the emergency start function that bypasses all protection against RSA, which relates to the core function of the hands-free function.

When the inventive method is used, the following happens instead:

The authentication element switches, as previously described, to the transponding/emergency start mode and receives the signal called the "challenge," which comes from an attacker in this case.

The authentication element now checks, however, whether a button is being/has been pressed on the authentication element in order to ensure that the person in physical possession of this authentication element actually intends to enable the emergency start function.

Since, however, no button is being pressed at this exact moment (the possession of the authentication element would be necessary for this), no valid response is returned.

A false response may be returned in order to confuse a potential attacker and to provide the vehicle system with evidence that the attempt is an RSA attack. The attack will be unsuccessful as a result.

REFERENCE NUMERAL LIST

1 Authentication element
2 Transponding interface
3 Antennas

4 Key button device
6 Signal processing and forwarding device
10 Apparatus
12 Control system
12a Function logic
13 Reading device
14 Antennas
20 Vehicle
30 Authentication system

The invention claimed is:

1. An authentication element including a keyless go device for a vehicle, the authentication element comprising:
   a transponding interface for transmitting an authentication signal and for receiving power and data, and
   a key button device for detecting user input,
   wherein said authentication signal is transmitted over the transponding interface when the key button device detects user input; wherein:
   the authentication element has a signal processing and forwarding device,
   the signal processing and forwarding device is connected to the transponding interface and to the key button device,
   the signal processing and forwarding device detects the user input of the key button device,
   a predefined reference value is stored in the authentication element in the signal processing and forwarding device for comparison,
   the signal processing and forwarding device transmits authentication signals over the transponding interface,
   the authentication signals contain user input detected at the key button device.

2. The authentication element in accordance with claim 1, wherein:
   the key button device for detecting user input has an operating element, which is activated through pressing and then returned to its original position,
   the signal processing and forwarding device is designed such that the detected user input is compared to the reference value,
   when the comparison is positive, the signal processing and forwarding device transmits authentication signals over the transponding interface.

3. An authentication system for vehicles with at least one authentication element in accordance with claim 1, comprising:
   an apparatus, wherein:
   the apparatus has a reading device for sending power and data as well as receiving authentication signals,
   the transponding interface of the authentication element can be attached to the reading device for the apparatus in order to transmit authentication signals to the reading device after receiving power and data and
   the apparatus is designed such that a function is activated after receiving transmitted authentication signals.

4. The authentication system in accordance with claim 3 wherein
   the apparatus has a control system, specifically function logic for processing authentication signals that is connected to the reading device,
   there are stored authentication signals for comparison stored in the apparatus, specifically in the function logic,
   the received and stored authentication signals contain a user input detected by the key button device,
   the function logic compares received authentication signals to stored authentication signals.

5. A process for checking an authentication request intended by a user on an authentication element of a vehicle with an authentication system in accordance with claim 3 whereby the process has the following steps:
   arranging the authentication element in the transmitting and reception area of the reading device of the apparatus,
   receiving power, whereby the transponding interface of the authentication element receives power from the reading device of the apparatus,
   detecting the user input on the authentication element by the key button device,
   generating authentication signals which include the detected user input,
   transmitting the authentication signals from the authentication element to the apparatus, and
   comparing the detected authentication signals with stored authentication signals in the apparatus.

6. The process of claim 5, wherein:
   the detection of the user input includes a detection by the signal processing and forwarding device of the authentication element,
   the detection of the user input includes detecting that an operating element of the key button device has been pressed,
   the reference value is stored in the signal processing and forwarding device of the authentication element,
   the stored authentication signals are stored in the function logic of the apparatus,
   in the event of a positive comparison, the detected user input is below or above the reference value or corresponds to the reference value,
   if the comparison is positive, the detected authentication signals match the stored authentication signals.

7. The process of claim 5, wherein:
   the function logic compares the authentication signals of the authentication element to the stored authentication signals of the apparatus,
   the signal processing and forwarding device is designed such that the detected user input is compared to the stored reference value,
   the signal processing and forwarding device uses a wireless connection of the transponding interface and reading device to transmit authentication signals to the function logic of the apparatus,
   the step of transmitting the authentication signals preferably includes encryption and/or compression of the authentication signals.

8. A process for checking an authentication request intended by a user on an authentication element of a vehicle with an authentication system in accordance with claim 3 whereby the process has the following steps:
   arranging the authentication element in the transmitting and reception area of the reading device of the apparatus,
   receiving power, whereby the transponding interface of the authentication element receives power from the reading device of the apparatus,
   detecting the user input on the authentication element by the key button device,
   comparing the detected user input in the authentication element with a reference value, whereby, when the comparison is positive, transmission of authentication signals is initiated from the authentication element to the apparatus.

* * * * *